(12) United States Patent
Siciliano et al.

(10) Patent No.: US 6,427,816 B1
(45) Date of Patent: Aug. 6, 2002

(54) POWER LINE FOR AN ELECTRIC VEHICLE (75) Inventors: Vito Siciliano, Pieve Ligure; Alcide Del Naja, Naples, both of (IT)

(73) Assignee: Ansaldo Trasporti S.p.A., Naples (IT)

( * ) Notice: Subject to any disclaimer, the term of this patent is extended or adjusted under 35 U.S.C. 154(b) by 0 days.

(21) Appl. No.: 09/462,029

(22) PCT Filed: Jun. 30, 1998

(86) PCT No.: PCT/IT98/00181
§ 371 (c)(1),
(2), (4) Date: May 9, 2000

(87) PCT Pub. No.: WO99/00267
PCT Pub. Date: Jan. 7, 1999

(30) Foreign Application Priority Data

Jun. 30, 1997 (IT) ......................... TO97A0569

(51) Int. Cl.[7] ............................... B60M 1/00
(52) U.S. Cl. ....................................... 191/18
(58) Field of Search ............... 191/10, 17, 18, 191/19, 22 R, 25, 22 C (56) References Cited

U.S. PATENT DOCUMENTS

| | | | | |
|---|---|---|---|---|
| 678,213 A | * | 7/1901 | Anck | 191/18 |
| 694,843 A | * | 3/1902 | Dion | 191/18 |
| 767,534 A | * | 8/1904 | Whittier | 191/18 |
| 807,199 A | * | 12/1905 | Palmer | 191/18 |
| 898,216 A | * | 9/1908 | Granger | 191/18 |
| 5,810,136 A | * | 9/1998 | Siciliano et al. | 191/18 |

* cited by examiner

Primary Examiner—Mark T. Le
(74) Attorney, Agent, or Firm—Quarles & Brady LLP (57) ABSTRACT

A power line (1) for an electric vehicle (80), wherein a hollow elongated insulating enclosure (4) is fitted on top with a number of conducting plates (34) aligned in the traveling direction (8) of the vehicle and substantially coplanar with a horizontal road surface (ST). The enclosure (4) houses an elastically deformable strip conducting element (60) extending in the traveling direction and having a portion of ferromagnetic material (65). The strip conducting element (60) is attracted by the magnetic field generated (147) by the electric vehicle (80) traveling along the line, so as to deform and raise a portion (60a) of the strip conducting element (60) and connect one conducting plate (34) to a positive supply line (27) inside the enclosure. First and second elongated conducting elements (35, 35c) are provided on opposite sides of the conducting plates (34), and communicate with a ground potential to laterally define, in a direction crosswise to the traveling direction of the vehicle, a road surface safety region housing the conducting plates (34), and outside which the potential assumes a substantially zero voltage value, even in the presence of a layer of conducting fluid on the road surface (ST).

11 Claims, 4 Drawing Sheets

POWER LINE FOR AN ELECTRIC VEHICLE

TECHNICAL FIELD

The present invention relates to a power line for an electric vehicle.

BACKGROUND ART

Power lines for electric vehicles are known, which comprise a number of substantially flat conducting plates aligned in the traveling direction of the vehicle, substantially coplanar with a horizontal surface (e.g. a road surface), and separated by insulating elements. The conducting plates are connected in succession to a power supply source by a magnetic energizing signal supplied by the electric vehicle traveling along the power line, so the electric vehicle comprises a magnetic energizing member (e.g. a permanent magnet or electromagnet) for energizing the power line and so supplying the conducting plate, and at least one current pickup member for establishing a sliding electric contact with the live plate and picking up current by which to power the electric vehicle.

One example of a power line for an electric vehicle is described in European Patent Application EP 96113023.4, which relates to a power line in which a hollow elongated insulating enclosure is fitted on top with a number of conducting plates aligned in the traveling direction of the vehicle and separated by insulating elements interposed between adjacent conducting plates. The enclosure houses an elastically deformable strip conducting element, which extends in the traveling direction of the vehicle, comprises a strip portion made of ferromagnetic material, and is attracted by the magnetic field generated by electromagnets on the electric vehicle so as to flex a portion of the strip conducting element towards the conducting plates and so connect at least one conducting plate to a power line inside the enclosure. Another example of a power line for an electric vehicle is described in German Patent n° 1.011.914 taken out by Ludwig Reihardt, published on Jul. 11, 1957, and in which an elongated insulating enclosure, closed at the top by a number of conducting plates aligned in a straight direction and insulated from one another, houses an elastically deformable strip conducting element made of ferromagnetic material, and which is attracted by the magnetic field generated by electromagnets to flex a portion of the strip conducting element towards the conducting plates to supply at least one of the plates.

The conducting plates are separated by spacer elements made of insulating material and arranged in the traveling direction of the electric vehicle, and are normally coplanar with a substantially horizontal surface, e.g. a road surface, made of nonconducting material (e.g. concrete). Lateral insulation of the plates, i.e. towards the road surface and crosswise to the traveling direction of the electric vehicle, is seriously compromised, however, in the event the road surface is covered with a thin layer of rainwater, in which case, potential decreases, on either side of the conducting plates and crosswise to the traveling direction of the electric vehicle, from a maximum at a live plate, to substantially zero at a distance of several meters from the live plate, thus seriously endangering anyone in the vicinity of the live plates. The main object of the present invention is to eliminate the aforementioned drawback.

Moreover, the strip conducting element of known power lines is attracted by a magnetic field directed by the electric vehicle through the conducting plates to the strip conducting element, the magnetic attraction of which is therefore at times weakened by the shielding effect of the conducting plates.

DISCLOSURE OF INVENTION

It is a further object of the present invention to provide a power line for an electric vehicle, which provides for eliminating any shielding effect of the plates, and so ensuring strong attraction of the strip conducting element.

BRIEF DESCRIPTION OF THE DRAWINGS

A preferred non-limiting embodiment of the invention will be described by way of example with reference to the accompanying drawings, in which.

BEST MODE FOR CARRYING OUT THE INVENTION

Figure 1:
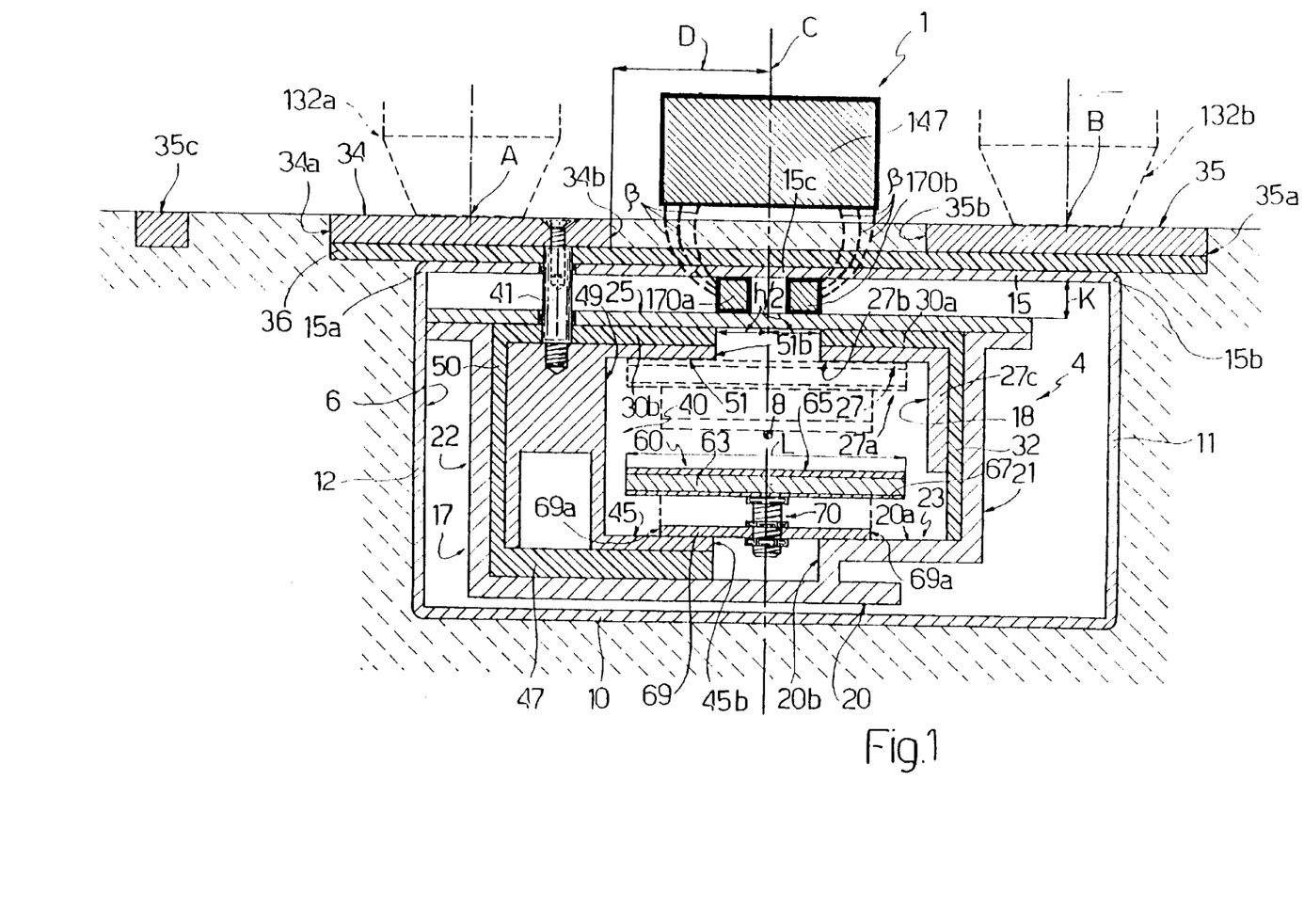
FIG. 1 shows a cross section of the power line according to the present invention.
Figure 2:
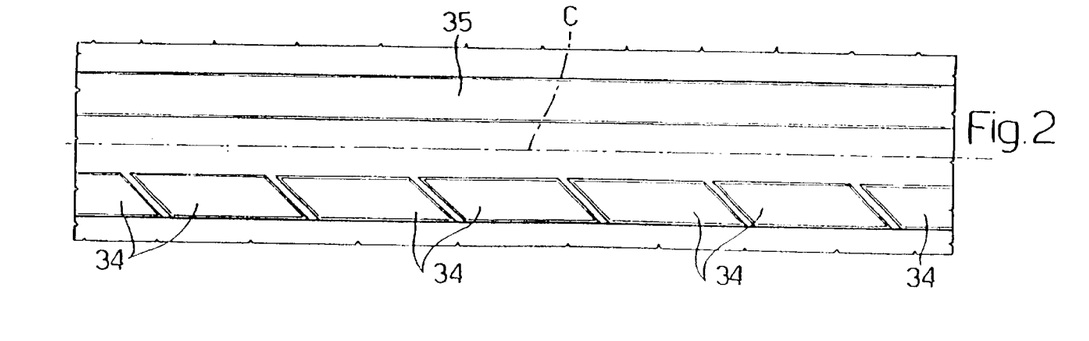
FIG. 2 shows a top plan view of the FIG. 1 line.

With reference to FIGS. 1 and 2, number 1 indicates as a whole a modular power line for an electric vehicle.

Power line 1 comprises a number of elongated insulating enclosures (modules) 4, each defining internally an elongated parallelepiped cavity 6 extending in a straight direction (along an axis) 8.

More specifically, each enclosure 4 is formed in one piece, and comprises a horizontal bottom insulating wall 10; two vertical lateral insulating walls 11, 12 perpendicular to wall 10; and a horizontal top insulating wall 15 parallel to and opposite bottom wall 10.

Enclosure 4 houses a metal conducting enclosure 17, which defines internally an elongated parallelepiped cavity 18 extending along axis 8, and comprises a bottom wall 20 facing wall 10; two vertical lateral walls 21, 22 integral with and perpendicular to wall 20; and a flat top metal wall 25 parallel to and separated from wall 15 by a constant distance K.

Enclosure 17 houses a first electric power conducting line 27 comprising a straight metal conducting element located in an upper portion of cavity 18 and separated electrically from adjacent metal walls 21 and 25. More specifically, conducting element 27 has a substantially L-shaped cross section, and comprises a first horizontal flat portion 27a adjacent and parallel to a flat insulating wall portion 30a on the underside of a right lateral portion of wall 25; and a second vertical flat portion 27c perpendicular to and integral with portion 27a, and supported on a vertical insulating wall 32 parallel and adjacent to metal vertical wall 21.

Metal enclosure 17 defines a second electric power conducting line 23 extending substantially the whole length of insulating enclosure 4.

With reference in particular to FIG. 1, power line 1 comprises a number of flat metal plates 34 located outside enclosures 4, aligned in a straight direction A parallel to axis 8, and positioned with long edges parallel to direction A, which extends through the center of each metal plate.

Plates 34 have perimeters in the form of parallelograms, with long straight edges parallel to the vehicle traveling direction A, and short straight edges adjacent to one another and inclined with respect to the vehicle traveling direction.

More specifically, each plate 34 is fitted to top wall 15 via the interposition of a rubber sheet 36, is connected to enclosure 4 by fastening devices (not shown), is located at a lateral edge 15a of wall 15, and has a first end edge 34a (corresponding to a first long side of the perimeter) projecting from enclosure 4, and a second end edge 34b (corresponding to a second long side of the perimeter) separated by a distance D from the central plane of symmetry C, perpendicular to walls 10 and 15, of enclosure 4.

Power line 1 also comprises a first ground line 35 located outside each enclosure 4 and comprising a flat elongated rectangular element extending in a straight direction B parallel to direction A on the opposite side of plane of symmetry C, and which extends through the center of rectangular element 35.

More specifically, rectangular element 35 is fitted to top wall 15 via the interposition of rubber sheet 36, is connected to enclosure 4 by fastening devices (not shown), is located at a lateral edge 15b of wall 15, and has a first end edge 35a projecting from enclosure 4, and a second end edge 35b separated by distance D from central plane of symmetry C. Power line 1 also comprises a second ground line 35c located outside each enclosure 4 and comprising a flat elongated rectangular element facing end edge 34a and extending in a straight direction parallel to direction B on the opposite side of plates 34 to plane of symmetry C. That is, ground lines 35 and 35c extend parallel to and at a distance from each other along opposite sides of plates 34.

Power line 1 also comprises a number of insulating elements 37 (FIG. 4) located outside enclosures 4 and interposed between the short-side edges of plates 34. More specifically, each insulating element 37 is interposed between, and electrically separates, two adjacent metal plates 34; and each metal plate 34 communicates with a respective electric distributor 40 housed inside cavity 18 and connected to plate 34 by a respective electric conductor 41 (shown schematically) extending through an insulating wall 30b, metal wall 25 (from which the electric conductor is insulated), wall 15 of enclosure 4, and rubber sheet 36.

Distributor 40 substantially comprises a C-shaped metal wall, in turn comprising a first flat horizontal portion 45 supported on an insulating wall 47 superimposed on metal bottom wall 20; a second vertical portion 49 facing metal lateral wall 22 and separated electrically from wall 22 by an insulating wall 50; and a third flat horizontal portion 51 perpendicular to and integral with vertical portion 49, and contacting a flat insulating wall portion 30b on the underside of a left lateral portion of wall 25 and separated by a distance h from portion 30a.

Flat portions 51 and 45 are therefore parallel and face each other on opposite sides of cavity 18; and portions 51 and 45 of the various distributors 40 are located along axis 8 and along the whole length of enclosure 4 to respectively define first and second electric collectors for the purpose explained later on.

Flat portion 45 (second collector) is coplanar with a portion 20a of the second electric power line; flat portion 45 and portion 20a are separated electrically and have respective edges 45b and 20b facing and parallel to each other; and edges 45b and 20b are equidistant (distance h/2) from plane of symmetry C.

Flat portion 51 (first collector) is coplanar with portion 27a of the first electric power line; flat portion 51 and portion 27a are separated electrically and have respective edges 51b and 27b facing and parallel to each other; and edges 51b and 27b are equidistant (distance h/2) from plane of symmetry C.

Distributor 40 comprises a strip conducting element 60 housed inside cavity 18, and which extends the whole length of enclosure 4, is substantially perpendicular to and symmetrical with plane C when in a rest position (FIG. 1), and has opposite end portions (not shown) fitted to supporting and connecting devices (not shown) at opposite ends of enclosure 4.

Strip element 60 comprises a central portion 63 defined by a strip of flexible insulating material supporting conducting portions located on opposite sides of insulating strip 63. More specifically, insulating strip 63 supports a flexible top conducting strip 65 made of ferromagnetic material, and which is integral with and superimposed on strip 63, faces wall 15, and is of a width L greater than the distance h between facing edges 51b and 27b. Insulating strip 63 also supports a flexible bottom strip 67 made of ferromagnetic material, and which is integral with the underside of strip 63, faces wall 20, and is of width L. Strip 67 is fitted underneath with a number of flat rectangular metal (e.g. copper) elements 69 facing strip 67 in a plane substantially parallel to the plane of strip 67 when undeformed. Each element 69 has short edges 69a parallel to the long edges of strip 67, and long edges of a length slightly less than width L; each flat rectangular element 69 is supported by an articulated device 70 extending from strip 67 to element 69 and made of plastic insulating material; elements 69 are equally spaced along strip element 60 with a spacing substantially equal to the distance P between adjacent collectors 40; and distance P is substantially equal to the distance, measured parallel to axis 8, between central portions of adjacent flat horizontal portions 45.

Each insulating enclosure 4 comprises, at two opposite end portions, respective supporting and connecting devices (not shown), each of which provides for supporting and permitting a substantially transverse movement of an end portion of strip conducting element 60.

Power line 1 is formed by arranging a number of enclosures 4 adjacent to one another and aligned in a straight vehicle traveling direction; the adjacent end portions (not shown) are connected mechanically by means of bridging devices (not shown) to form an overall strip element extending the whole length of line 1 and defined by the strip conducting elements 60 of the various connected enclosures 4; and electric lines 27 and 23 of one enclosure are connected electrically to the corresponding electric lines of the adjacent enclosure by means of external connecting cables (not shown). In one non-limiting embodiment, line 1 may be laid in a road surface ST (FIG. 4), with enclosures 4 housed inside a parallelepiped seat sunk into road surface ST. In which case, plates 34 and first and second ground lines 35, 35c face upwards and are substantially coplanar with road surface ST; power line 23 and ground lines 35 and 35c are conveniently connected to a ground potential; and power line 27 is connected to a positive supply potential.

Power line 1 is used in conjunction with an electric vehicle 80 (shown schematically in FIG. 4) traveling along road surface ST.

Electric vehicle 80 comprises two axles; a frame, e.g. a self-supporting frame, defined at the bottom by a floor 82 facing road surface ST, plates 34 and ground line 35; and a known electric motor 83 for powering vehicle 80 and supplied by a control circuit 85 receiving a positive voltage Val and a reference potential Vref, both picked up from line 1 by a current pickup device 86 in accordance with the teachings of the present invention.

The current pickup device (FIG. 3) comprises a lateral actuating device 100 fitted to floor 82 of vehicle 80; an arm 102 having a first end carried in sliding manner by device 100; and a structure 104 carried by a second end of arm 102 and having members for magnetically energizing line 1, and current pickup members which, as described later on, mate with plates 34 and ground line 35 to power electric vehicle 80.

Figure 3:
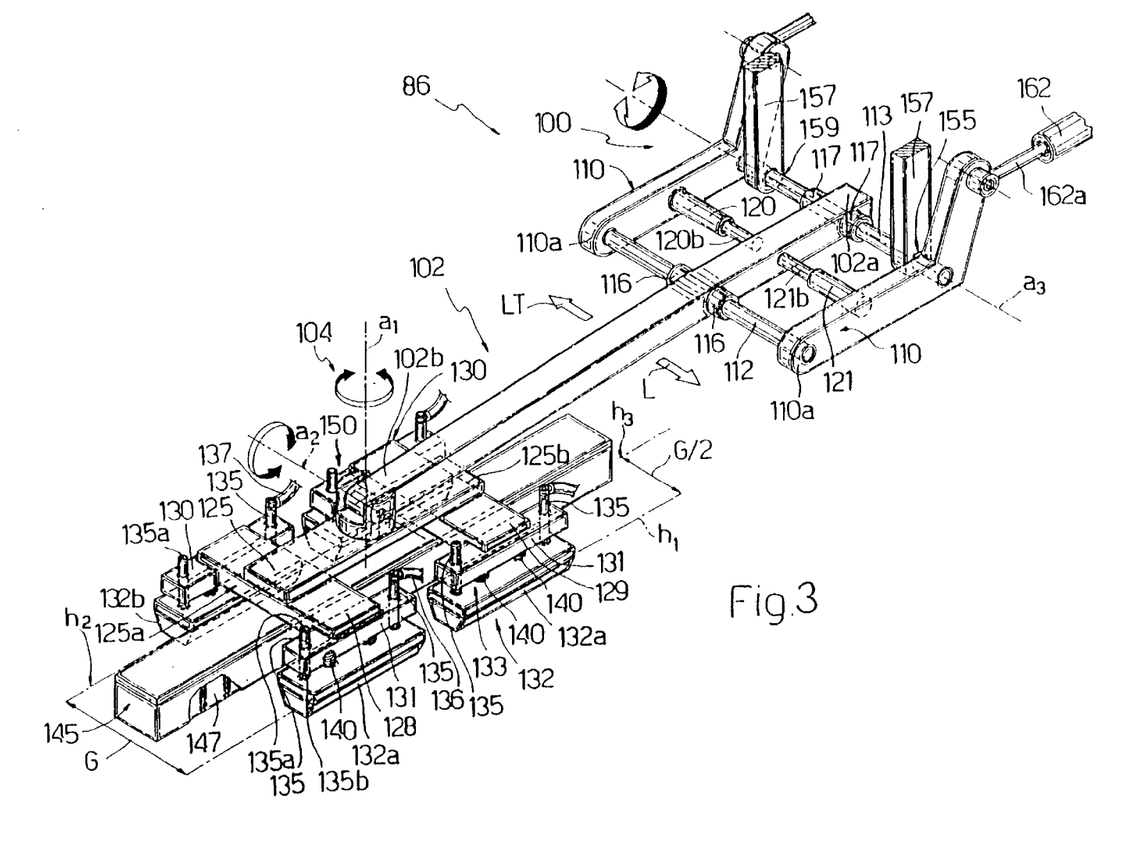
FIG. 3 shows a view in perspective of a current pickup device which may be used on the FIGS. 1 and 2 line.

More specifically, device 100 comprises a pair of flat L-shaped elements 110 spaced parallel to each other and connected by a pair of parallel cylindrical rods 112, 113 extending between L-shaped elements 110. More specifically, each end portion of rod 112 is fitted stably to a respective end of a long-side portion 110a of a respective L-shaped element, and each end portion of rod 113 is fitted stably to a respective elbow portion of a respective L-shaped element.

Arm 102 has a substantially rectangular cross section, and comprises, at end 102a connected to device 100, two cylindrical tubular bodies 116, 117 perpendicular to the longitudinal axis of arm 102, fitted stably to arm 102, and housing respective rods 112 and 113, so that arm 102 is movable back and forth in a straight direction LT-L perpendicular to the longitudinal axis of arm 102. The movement of arm 102 in direction LT may be controlled by a pair of pneumatic actuators 120, 121 located on opposite sides of arm 102 and each comprising a casing fitted stably to a respective element 110, and an output member 120b, 121b having an end portion fitted to arm 102 and movable with respect to the casing in a straight-direction parallel to rods 112 and 113.

Structure 104 comprises a straight, flat, substantially rectangular central element 125 made of insulating, in particular plastic, material; and a pair of flat, rectangular insulating cross members 128, 129 perpendicular to central element 125 and having central portions fitted stably, e.g. by means of metal bolts (not shown), to end portions 125a, 125b of central element 125, so that cross members 128, 129 and central element 125 define an H-shaped insulating supporting structure. Each end portion of each straight cross member 128, 129 supports a rectangular insulating supporting pad 130, 131 with the long sides parallel to the longitudinal axis of central element 125; and each insulating pad 130, 131 supports a respective electric contact element 132 made of conducting material, located on the opposite side of pad 130, 131 to arm 102, and preferably in the form of a truncated pyramid with an elongated rectangular base. Each electric contact element 132 is spaced with respect to pad 130, 131, and is supported on a shock-absorbing device 133 permitting travel to and from pad 130, 131. More specifically, each pad 130, 131 comprises, at each end portion, a through hole engaged by a metal supporting element 135 having a top end portion 135a projecting from pad 130, 131 towards arm 102, and a bottom end portion 135b projecting downwards from pad 130, 131 and fitted stably to a long-side end portion of electric contact element 132. Metal supporting element 135 enables electric contact element 132 to move to and from pad 130, 131; and each electric contact element 132 is connected to a pair of coil springs 140 located between the long-side end portions of electric contact element 132 and the facing wall of pad 130, 131. The electric contact elements 132a on one side of central element 125 (and therefore carried by respective first ends of cross members 128, 129) are aligned in a direction h1; the electric contact elements 132b on the other side of central element 125 (and therefore carried by respective second ends of cross members 128, 129) are aligned in a direction h2 parallel to direction h1; directions h1 and h2 are separated by a constant distance G substantially equal to the distance between short-side central portions of electric contact elements 132a, 132b carried at opposite ends of the same cross member 128, 129; and electric contact elements 132a communicate with first electric cables 136 to supply circuit 85 with positive supply voltage, while electric contact elements 132b communicate with second electric cables 137 to supply circuit 85 with negative supply voltage, or vice versa.

Structure 104 also comprises an elongated parallelepiped casing 145 fitted beneath cross members 128, 129 with its longitudinal axis h3 perpendicular to cross members 128, 129 and therefore parallel to alignment directions h1 and h2. Casing 145 is also located in an intermediate position with respect to electric contact elements 132a and 132b, so that longitudinal axis h3 is an equal distance G/2 from alignment directions h1 and h2, is made of nonmagnetic material (e.g. aluminium), and houses a number of parallelepiped permanent magnets 147 packed together and aligned along axis h3.

A central portion, facing arm 102, of element 125 is connected to a free end portion 102b of arm 102 by a known articulated device 150 for permitting rotation of structure 104, with respect to arm 102, about a horizontal axis a2 perpendicular to the longitudinal axis of arm 102, and about a vertical axis a1 perpendicular to axis a2. Alternatively, articulated device 150 shown in FIG. 3 may comprise a spherical articulated device.

Actuating device 100 is hinged to floor 82 of electric vehicle 80, and is movable with respect to the floor to lift and lower structure 104. More specifically, rod 113 is carried by a pair of straight brackets 157 extending downwards from floor 82 of vehicle 80, and the respective free ends of which have respective through holes 159 aligned along an axis a3 and engaged by rod 113 which is coaxial with axis a3. Actuating device 100 is rotated about axis a3 by an actuator 162 fitted to the frame of vehicle 80 and having an output member 162a connected to a short-side end portion of one of L-shaped elements 110. More specifically, actuating device 100 is rotated by actuator 162 between a rest (raised) position in which arm 102 is substantially horizontal and coplanar with floor 82, and structure 104 is detached from line 1, and a work (lowered) position (described in detail later on) in which arm 102 forms an angle of a few degrees with floor 82, and structure 104 rests on line 1.

The distance between the central portions of plates 34 and the center of ground line 35, i.e. the distance between directions A and B, substantially equals distance G between alignment directions h1 and h2, i.e. the distance between electric contact elements 132a, 132b on opposite sides of casing 145. Parallelepiped cavity 6 of each enclosure 4 houses a pair of straight square-section bars 170a, 170b (each side of the section substantially equal to distance K), which are parallel to each other, are aligned along axis 8, are interposed between walls 25 and 15, are located on opposite sides of plane of symmetry C, and are separated from plane C by a small distance substantially equal to half the side of the square section.

In actual use, when power line 1 is not engaged by electric vehicle 80, conducting element 60 is in a rest position (FIG. 1) in which it is substantially undeformed and parallel to bottom wall 20. More specifically, in the rest position, conducting strip 67 is substantially parallel to bottom wall 20, and each element 69 rests, along the whole length of each enclosure 4, on portion 20a of power line 23 and on a respective flat portion 45 of a distributor 40, thus establishing an electric connection between flat portions 45 and bottom wall 20, and therefore between all of distributors 40 (and plates 34) and power line 23.

As such, plates 34 are all connected to ground potential when strip conducting element 60 is in the rest position, so that line 1 is intrinsically insulated, by virtue of all the external parts (plates 34) being at ground potential, and the live parts (line 27) being inside insulating enclosure 4 (high degree of insulation of line 1) and being housed inside metal enclosure 17 (high degree of shielding of line 1). In the rest position, in fact, power line 27 (positive) is insulated from all the other metal parts of line 1 and housed inside metal enclosure 17. More specifically, line 27 is insulated and separated physically from portion 51 (first collector).

Electric vehicle 80 is positioned over power line 1. When disconnected from power line 1, electric vehicle 80 on road surface ST is powered by a pack of auxiliary batteries 180, which are carried by vehicle 80, are connectable to control circuit 85, and are disconnected when electric vehicle 80 is connected to line 1. When positioning electric vehicle 80, arm 102 is in the raised rest position and electric contact elements 132 do not contact any part of power line 1; and electric vehicle 80 is positioned with electric contact elements 132a, 132b substantially facing plates 34 and ground line 35 respectively. Arm 102 is then lowered so that electric contact elements 132a rest at least partly on plates 34, and electric contact elements 132b rest at least partly on ground line 35; in which position (FIG. 1), permanent magnets 147 are positioned facing the central portion of an enclosure 4 through which plane of symmetry C extends, and are therefore located at bars 170a and 170b. Wall 15 and rubber sheet 36, both made of nonmagnetic material, are interposed between the permanent magnets and bars 170a, 170b, so that the magnetic field lines B produced by permanent magnets 147 are directed downwards towards enclosure 4 and at least partly into straight bars 170a, 170b. A magnetic force of attraction is therefore created between magnets 147 and straight bars 170a, 170b, so that structure 104 is drawn downwards to ensure good electrical contact between contact elements 132a and plates 34, and between contact elements 132b and ground line 35. Structure 104 is also shifted laterally and centered automatically with respect to line 1, by magnets 147—for known physical reasons—being positioned at a minimum possible distance from straight bars 170a, 170b; which minimum possible distance corresponds to the FIG. 1 position, in which longitudinal axis h3 substantially extends along plane of symmetry C, and contact elements 132a, 132b are separated by distance G/2 from plane of symmetry C and are respectively located at the centers of plates 34 and ground line 35 (self-centered position).

Structure 104 is movable freely into position with respect to line 1 by arm 102 being movable laterally in direction LT-L, and structure 104 itself being permitted to rotate about axes a1 and a2.

In the self-centered position, part of the magnetic field lines nevertheless interact with ferromagnetic conducting strip 65.

Ground line 35 and plates 34 extend partly over wall 15 of enclosure 4, and have respective facing edges 34b, 35b separated by a distance 2D at a central portion 15c of top wall 15 intersected by plane of symmetry C; and strip element 60, inside enclosure 4, also faces central portion 15c of top wall 15, so that the magnetic field generated by magnets 147 towards strip 65 travels through rubber sheet 36 and central portion 15c (both made of insulating material) and though wall 25 made of nonmagnetic metal material (e.g. aluminium) but of limited thickness. As such, plates 34 are not interposed between magnets 147 and strip 65, thus preventing any shielding effect by plates 34, and ensuring strong magnetic attraction of strip element 60.

Conducting element 60 is thus attracted and deformed upwards towards magnets 147. As shown clearly in FIGS. 1 and 4, the portion of strip conducting element 60 affected by the force of attraction arcs upwards towards wall 25. More specifically, the portion 60a of conducting element 60 located beneath structure 104 and magnets 147 (and therefore subjected to a strong force of attraction) moves into a raised work position parallel and adjacent to insulating wall 30 (FIGS. 1 and 4), with strip 65 contacting portion 27a of first power line 27 and at least one first collector 51.

Via strip 65, an electric connection is therefore established between first power line 27 and first collector 51, and therefore between line 27 and a plate 34. By virtue of the design of the current pickup device described above, the force of attraction of magnets 147 is generated along axis h3, and strip 65 is drawn upwards by a length substantially equal to the length of casing 145, and contacts the first collectors 51 of two adjacent distributors 40.

Two adjacent plates 34 beneath the supporting structure (live plates) are therefore connected to positive power line 27; and electric contact elements 132a are positioned contacting the live plates to supply positive electric power to electric motor 83.

Electric contact elements 132b are also positioned contacting the ground line to supply negative electric power to electric motor 83, so that vehicle 80 is powered along road surface ST by drawing energy from line 1, and, as the vehicle travels along, contact elements 132a, 132b define a sliding electric contact with plates 34 and ground line 35 respectively.

Figure 5:
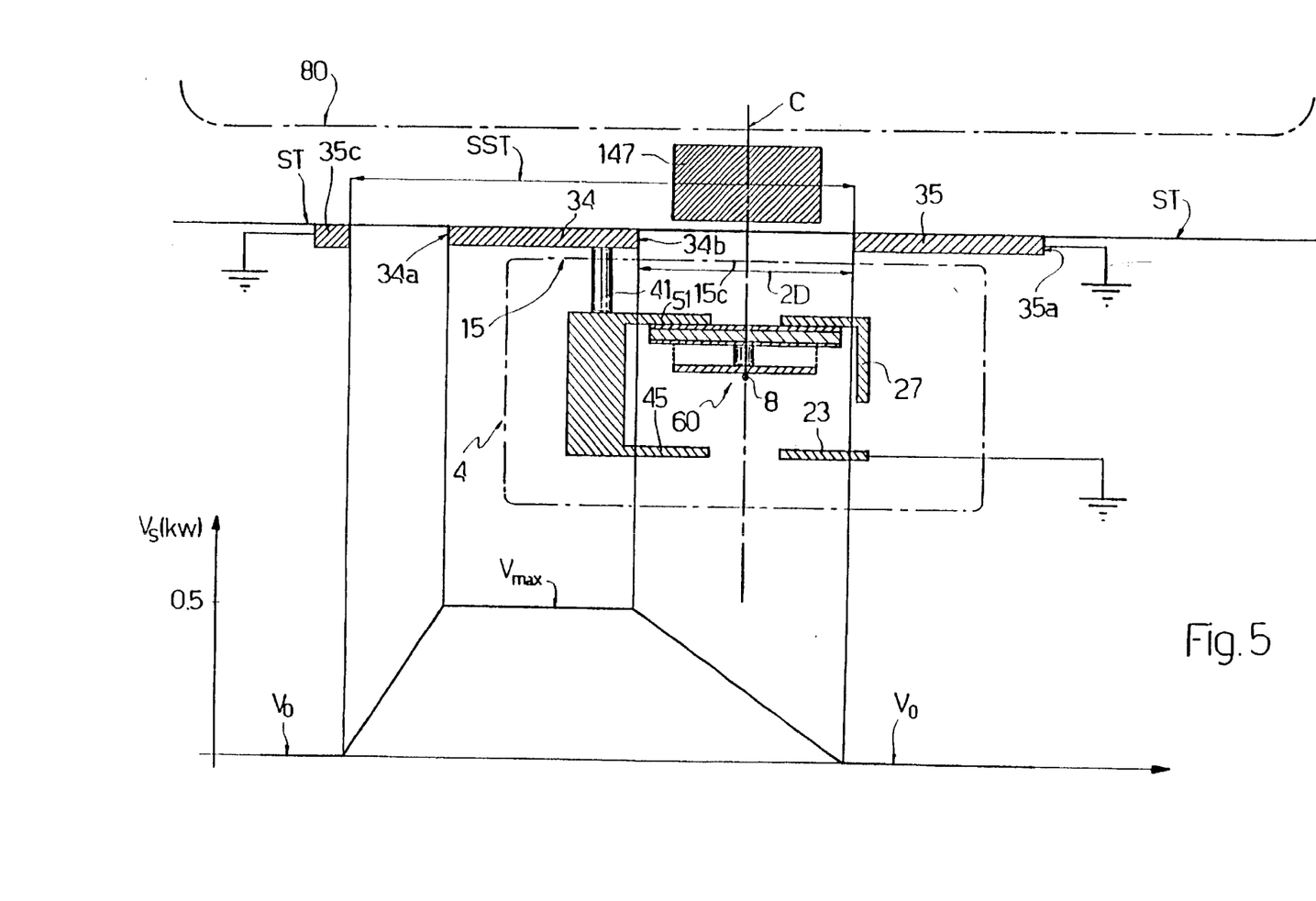
FIG. 5 shows a schematic operating diagram of the FIG. 1 line.

Each live plate 34 is enclosed laterally, i.e. crosswise to the traveling direction of the vehicle, by first ground line 35 and second ground line 35c, so that, in the presence of a layer of rainwater (or any other at least partly conducting fluid) on road surface ST, the surface potential $V_s$ (FIG. 5) on the road surface decreases, on either side of conducting plates 34 and crosswise to the traveling direction of the electric vehicle, from a maximum value $V_{max}$ (e.g. 500 volts) corresponding to the voltage applied to the plate, to a minimum value $V_o$ of substantially zero at ground lines 35 and 35c (conducting and grounded). As such, the high-potential (potentially hazardous) region is confined within a safety region SST of road surface ST, defined laterally, crosswise to the traveling direction of the vehicle, by lines 35 and 35c. And, as lines 35 and 35c are located extremely close to plates 34 and inaccessible from outside electric vehicle 80, safety region SST is also made inaccessible from outside vehicle 80, thus preventing any current dispersion along road surface ST, even in the presence of water or other conducting fluid on road surface ST. Ground line 35 therefore provides for both supplying negative power by which to drive the electric vehicle, and at the same time defining one side of safety region SST.

Together with coil springs 140, supporting elements 135 enable each electric contact element 132a, 132b to move to and from supporting structure 104 in a direction substantially crosswise to the traveling direction of the vehicle to compensate for any breaks or vertical unevenness of line 1.

Supporting structure 104 is movable with respect to the moving electric vehicle 80 by virtue of the connection between tubular bodies 116, 117 and rods 112, 113 enabling arm 102 to move laterally (in direction LT-L); and supporting structure 104 is also movable with respect to arm 102 by virtue of articulated device 150.

Figure 4:
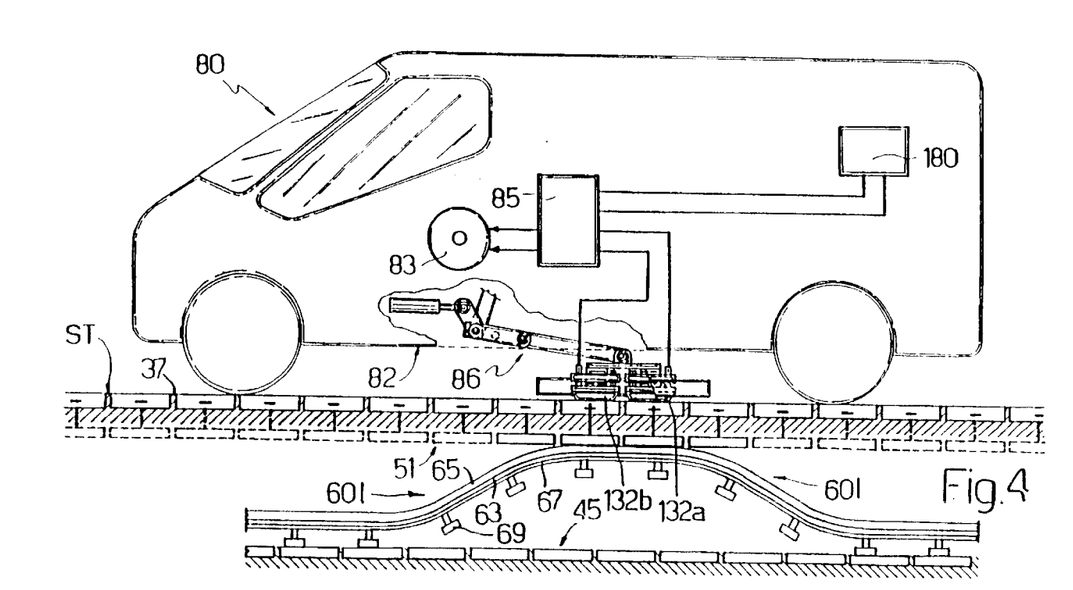
FIG. 4 shows, schematically, an electric vehicle powered by the FIGS. 1 and 2 line.

The portions of strip conducting element 60 adjacent to portion 60a are inclined with respect to portion 60a and slope downwards by force of gravity towards wall 10; which inclined portions 601 are physically separated from first collector 51 and second collector 45 (FIG. 4), and are separated from first power line 27 and second power line 23 (FIG. 4).

Inclined portions 601 terminate at the point at which strip conducting element 60 rests on bottom wall 20 of second conducting line 23 and on second collectors 45 of distributors 40, so that all the nonlive plates 34 of line are connected to conducting line 23.

As electric vehicle 80 travels along, successive portions of strip element 60 are deformed, and portion 60a, following the movement of the electric vehicle, travels along the various enclosures 4 forming part of line 1. The arced portion 60a of strip conducting element 60 thus travels wavelike along line 1, from one end to the other of each enclosure 4, and, on reaching the end portion of one enclosure 4, moves on to the end portion of the adjacent enclosure 4.

As electric vehicle 80 travels along, the correct position of electric contact elements 132a, 132b carried by supporting structure 104 is ensured, in that any lateral swerving of the supporting structure induced by the moving vehicle moves magnets 147 away from the self-centered position described to lengthen the path of the magnetic field between magnets 147 and straight bars 107a, 107b, and is rapidly rectified when magnets 147 move back into the minimum-energy self-centered position.

What is claimed is:

1. A power line for an electric vehicle, comprising:

a supporting enclosure defining an elongated inner cavity;

a plurality of conducting elements arranged in a traveling direction of the electric vehicle and separated electrically from one another;

at least a first conducting line carried inside said enclosure and supplied with a first polarity; and at least a strip element extending inside said enclosure, in said traveling direction and substantially along the whole length of the line;

said strip element being elastically deformable, and comprising at least a portion made of ferromagnetic material;

said portion made of ferromagnetic material interacting with a magnetic field generated by energizing means carried by said electric vehicle and for attracting at least a portion of said strip element into a raised contact position in which a portion of said strip element is deformed to establish an electric connection between said first conducting line and at least one of said plurality of conducting elements;

wherein said power line also comprises:
      first conducting means, which are located outside said enclosure, on supporting means, and extend, at a distance and electrically separated from said conducting elements, alongside said traveling direction of the vehicle; and
      second conducting means located, outside said enclosure, on said supporting means, and extending, at a distance and electrically separated from said conducting elements, alongside said traveling direction of the vehicle;
   said first conducting means and said second conducting means being located on opposite sides of said conducting elements, and communicating electrically with a reference potential, in particular a ground potential, to laterally define, in a direction crosswise to said traveling direction of the vehicle, a safety region of said supporting means, said safety region defined between said first conducting means and said second conducting means, said first and second conducting means having a potential close to the reference potential even in presence of environmental conditions including partially conducting fluids on said supporting means.

2. A power line as claimed in claim 1, wherein said first conducting means comprise a continuous elongated conducting element extending substantially parallel to said traveling direction of the vehicle.

3. A power line as claimed in claim 2, wherein said continuous elongated conducting element comprises a flat elongated rectangular element extending substantially parallel to said traveling direction of the vehicle.

4. A power line as claimed in claim 1, wherein said second conducting means comprise a continuous elongated conducting element extending substantially parallel to said traveling direction of the vehicle.

5. A power line as claimed in claim 1, wherein said first conducting means comprise an elongated element extending substantially parallel to said traveling direction of the vehicle;

said elongated element and said conducting elements extending at least partly over at least a top wall of said enclosure, and having respective facing edges separated by a distance from each other and disposed in proximity to a central portion of said top wall; said strip element facing, inside said enclosure, said central portion of said top wall.

6. A power line as claimed in claim 1, wherein said conducting elements comprise plates electrically separated from one another, carried by said enclosure and aligned in said traveling direction.

7. A power line as claimed in claim 1, wherein said cavity houses first collector means and second collector means;

wherein each conducting element communicates electrically with said first collector means and said second collector means housed in said cavity;

said cavity also housing said first conducting line and a second conducting line separated from the first conducting line;

said strip element establishing an electrical contact between said second conducting line and said second collector means in relation to the portions of said strip element in a lowered rest position in which the strip element is undeformed elastically and rests on said second collector means and on said second conducting line; and said strip element establishing an electrical contact between said first conducting line and said first collector means in relation to the portions of said strip element in said raised contact position.

8. A power line as claimed in claim 7, wherein said first collector means and said second collector means comprise flat conducting portions housed inside said cavity and facing each other on opposite sides of the cavity;

said first conducting line and said second conducting line comprising respective flat elongated conducting portions housed inside said cavity, facing each other, and extending substantially the whole length of said enclosure;

said strip element comprising:
      strip insulating means extending substantially the whole length of said enclosure;

first ferromagnetic conducting elements carried on a first side of said insulating means and facing said first collector means and said first conducting line;

second conducting elements carried on a second side of said strip insulting means and facing said collector means and said second conducting line;

said second conducting elements establishing an electric bridge connection between said second conducting line and said second collector means in relation to the portions of said strip element in said lowered rest position; and said first ferromagnetic conducting elements establishing an electric bridge connection between said first conducting line and said first collector means in relation to the portions of said strip element in said raised contact position.

9. A power line as claimed in claim 8, wherein said first conducting line comprises a contact portion substantially coplanar with a contact portion of said first collector means;

said first ferromagnetic conducting elements being interposed, in relation to the portion of said strip element in said raised contact position, between said contact portion of the first collector means and the contact portion of the first conducting line.

10. A power line as claimed as claim 9, wherein said second conducting line comprises a contact portion substantially coplanar with a contact portion of said second collector means;

said second conducting elements being of a width greater than the distance between adjacent edges of said contact portions of said second collector means and said second conducting line;

said second conducting elements being interposed, in relation to the portion of said strip element in said lowered rest position, between said contact portion of the second collector means and the contact portion of the second conducting line.

11. A power line as claimed in claim 1, wherein said conducting elements comprise parallelogram-shaped plates arranged with long straight edges parallel to the traveling direction of the vehicle, and short straight edges adjacent to one another and inclined with respect to said traveling direction of the vehicle.

* * * * *